(12) United States Patent
Cody et al.

(10) Patent No.: US 7,463,803 B2
(45) Date of Patent: Dec. 9, 2008

(54) DROP CABLE WITH FIBER OPTIC CONNECTOR AND METHODS FOR FABRICATING SAME

(75) Inventors: Joseph T Cody, Hickory, NC (US); Radawan Hall, Granite Falls, NC (US); Christopher Paul Lewallen, Hudson, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/598,927

(22) Filed: Nov. 14, 2006

(65) Prior Publication Data

US 2007/0110384 A1 May 17, 2007

Related U.S. Application Data

(60) Provisional application No. 60/736,358, filed on Nov. 14, 2005.

(51) Int. Cl.
G02B 6/44 (2006.01)

(52) U.S. Cl. ............................ 385/100; 385/54; 385/55; 385/56; 385/57; 385/58; 385/59; 385/60; 385/101; 385/103; 385/104; 385/105; 385/106

(58) Field of Classification Search ......... 385/100–101, 385/54–60, 103–106; 350/96
See application file for complete search history.

(56) References Cited

U.S. PATENT DOCUMENTS

| | | | |
|---|---|---|---|
| 4,047,797 A * | 9/1977 | Arnold et al. ................. | 385/78 |
| 4,902,238 A | 2/1990 | Iacobucci .................... | 439/135 |
| 4,961,623 A | 10/1990 | Midkiff et al. ............. | 350/96.2 |
| RE37,028 E | 1/2001 | Cooke et al. ................ | 385/112 |
| 6,188,822 B1 | 2/2001 | McAlpine et al. ........... | 385/100 |
| 6,206,579 B1 | 3/2001 | Selfridge et al. ............. | 385/60 |
| 6,234,683 B1 | 5/2001 | Waldron et al. ............... | 385/78 |
| 6,264,374 B1 | 7/2001 | Selfridge et al. ............. | 385/78 |
| 6,305,849 B1 | 10/2001 | Roehrs et al. ................. | 385/59 |
| 6,357,929 B1 | 3/2002 | Roehrs et al. ................. | 385/59 |
| 6,371,660 B1 | 4/2002 | Roehrs et al. ................. | 385/59 |
| 6,427,035 B1 | 7/2002 | Mahony ....................... | 385/15 |
| 6,466,725 B2 | 10/2002 | Battey et al. ................ | 385/135 |

(Continued)

FOREIGN PATENT DOCUMENTS

DE 3537684 10/1985

(Continued)

Primary Examiner—Brian Healy
Assistant Examiner—Guy G Anderson

(57) ABSTRACT

A substantially flat fiber optic drop cable assembly comprises: a fiber optic connector comprising a fiber optic ferrule and a housing; a crimp body coupled to the housing of the fiber optic connector; a fiber optic cable comprising a pair of strength members disposed partially within the fiber optic cable; a first sheath disposed between the fiber optic connector and the fiber optic cable, the first sheath coupled to the crimp body; a second sheath disposed between the fiber optic connector and the fiber optic cable, the second sheath coupled to the fiber optic cable; and a demarcation element joining the first sheath and the second sheath, wherein the demarcation element comprises a substantially tubular element; wherein the pair of strength members are configured to engage the crimp body about the first sheath, the second sheath, and the demarcation element.

20 Claims, 14 Drawing Sheets

U.S. PATENT DOCUMENTS

| | | | |
|---|---|---|---|
| 6,496,641 B1 | 12/2002 | Mahony | 385/135 |
| 6,522,804 B1 | 2/2003 | Mahony | 385/24 |
| 6,539,147 B1 | 3/2003 | Mahony | 385/24 |
| 6,542,674 B1 | 4/2003 | Gimblet | 385/113 |
| 6,546,175 B1 | 4/2003 | Wagman et al. | 385/113 |
| 6,579,014 B2 | 6/2003 | Melton et al. | 385/76 |
| 6,614,980 B1 | 9/2003 | Mahony | 385/135 |
| 6,619,697 B2 | 9/2003 | Griffioen et al. | 285/126.1 |
| 6,625,375 B1 | 9/2003 | Mahony | 385/135 |
| 6,648,520 B2 | 11/2003 | McDonald et al. | 385/78 |
| 6,668,127 B1 | 12/2003 | Mahony | 385/135 |
| 6,678,448 B2 | 1/2004 | Moisel et al. | 385/101 |
| 6,714,710 B2 | 3/2004 | Gimblet | 385/113 |
| 6,785,450 B2 | 8/2004 | Wagman et al. | 385/100 |
| 6,899,467 B2 | 5/2005 | McDonald et al. | 385/78 |
| 7,035,510 B2 * | 4/2006 | Zimmel et al. | 385/100 |
| 7,090,406 B2 | 8/2006 | Melton et al. | 385/62 |
| 7,090,407 B2 | 8/2006 | Melton et al. | 385/62 |
| 7,111,990 B2 | 9/2006 | Melton et al. | 385/53 |
| 2002/0106162 A1 | 8/2002 | Loder et al. | 385/53 |
| 2005/0276551 A1 * | 12/2005 | Brown et al. | 385/100 |
| 2006/0127026 A1 * | 6/2006 | Beck | 385/135 |
| 2006/0280408 A1 * | 12/2006 | Anderson et al. | 385/54 |

FOREIGN PATENT DOCUMENTS

| | | |
|---|---|---|
| EP | 0547778 | 11/1992 |
| EP | 0762171 | 3/1997 |
| EP | 0856761 | 8/1998 |
| EP | 1258758 A2 | 11/2002 |
| EP | 1258578 A3 | 5/2004 |
| JP | 62-54204 | 3/1987 |
| JP | 5-106765 | 4/1993 |
| JP | 2001-116968 | 4/2001 |

* cited by examiner

DROP CABLE WITH FIBER OPTIC CONNECTOR AND METHODS FOR FABRICATING SAME

CROSS-REFERENCE TO RELATED APPLICATION

The present non-provisional patent application claims the benefit of priority of U.S. Provisional Patent Application No. 60/736,358, filed on Nov. 14, 2005, and entitled "Tether Installation at Demarcation Point," the contents of which are incorporated in-full by reference herein.

BACKGROUND OF THE INVENTION

1. Field of the Invention

The present invention relates generally to connectorized drop cables and methods for fabricating the same, and more specifically, to connectorized drop cables that may be readily interconnected with a mid-span access location of a fiber optic cable while including a demarcation point for isolating the connector from forces generated in the cable.

2. Technical Background of the Invention

Fiber optic networks are used to provide services from providers to subscribers over a vast network of optical signal carrying components. Within these networks, drop cables are often used to provide the end connection to one or more subscribers, such as at a home or office building. In one particular drop cable deployment environment, a drop cable may be interconnected with a mid-span access location of a fiber optic cable to branch the optical network. A mid-span access location may be used to provide multiple dedicated optical fiber drops that are used to connect a plurality of subscribers to the network. Thus, the mid-span access locations and drop cables are used to extend an optical network to subscribers. In this regard, networks are being developed that deliver "fiber-to-the-curb" (FTTC), "fiber-to-the-business" (FTTB), "fiber-to-the-home" (FTTH), and "fiber-to-the-premises" (FTTP), collectively referred to as "FTTx." Further, within these FTTx networks, it is desirable to deploy connectorized drop cables to provide simple interconnections while reducing field installation labor, skill and cost.

As FTTX cable assemblies evolve, the way in which stiff drop cables have been accommodated has changed. One problem with substantially flat drop cables is the stiffness of the cable and its impact on the polish process. To overcome this, an assembly approach is needed that will allow the use of a low force polish process while allowing reasonable manual assembly. A second issue requiring attention is the growing need to cost reduce the drop cable designs. To do this, one approach is to reduce the amount of strain relief material, however, doing this may result in strain reaching the connector when the cable is loaded. In addition to the polish problem, a solution is needed that keeps tension from reaching the ferrule assembly. In this regard, there is a need for a new drop cable design.

BRIEF SUMMARY OF THE INVENTION

The present invention provides various embodiments of substantially flat drop cables with MT fiber optic connectors or plug assemblies that may quickly and easily be connected at a mid-span access location within an optical network. The present invention also provides substantially flat drop cables that have a stiffness that is low enough such that low-force polishing does not become problematic. The present invention farther provides substantially flat drop cables that incorporate a minimum of relatively expensive strain relief material, while still limiting the amount of tension reaching the ferrule assemblies when the cables are loaded.

In one aspect, a substantially flat fiber optic drop cable assembly comprises: a fiber optic connector comprising a fiber optic ferrule and a housing; a first strain relief member coupled to the housing of the fiber optic connector; a fiber optic cable; a second strain relief member coupled to the fiber optic cable; an overmolded furcation section comprising telescoping tubing joining the first strain relief member coupled to the housing of the fiber optic connector and the second strain relief member coupled to the fiber optic cable; a first pair of strength members associated with the furcation section; and a second pair of strength members associated with the fiber optic cable. The fiber optic cable comprises one or more optical fibers disposed partially within the fiber optic cable. The one or more optical fibers disposed partially within the fiber optic cable are optically coupled to the fiber optic connector through the furcation section. Optionally, the one or more optical fibers comprise a ribbon of optical fibers.

In another aspect, a substantially flat fiber optic drop cable assembly comprises: a fiber optic connector comprising a fiber optic ferrule and a housing; a crimp body coupled to the housing of the fiber optic connector; a fiber optic cable comprising a pair of strength members disposed partially within the fiber optic cable; a buffer tube disposed partially within the fiber optic cable; and a flexible transition tube coupled to the crimp body and configured to telescope over the buffer tube; wherein the pair of strength members are configured to engage the crimp body about the buffer tube and flexible transition tube. The fiber optic cable comprises one or more optical fibers disposed partially within the fiber optic cable. The one or more optical fibers disposed partially within the fiber optic cable are optically coupled to the fiber optic connector through the buffer tube and flexible transition tube. Optionally, the one or more optical fibers comprise a ribbon of optical fibers. Preferably, the flexible transition tube is coupled to the crimp body via a lip structure manufactured into an end of the crimp body. Preferably, the pair of strength members are configured to engage a pair of channels manufactured into sides of the crimp body. The pair of channels manufactured into the sides of the crimp body comprise a plurality of raised ridges configured to retain the pair of strength members.

In a further aspect, a substantially flat fiber optic drop cable assembly comprises: a fiber optic connector comprising a fiber optic ferrule and a housing; a crimp body coupled to the housing of the fiber optic connector; a fiber optic cable comprising a pair of strength members disposed partially within the fiber optic cable; a first sheath disposed between the fiber optic connector and the fiber optic cable, the first sheath coupled to the crimp body; a second sheath disposed between the fiber optic connector and the fiber optic cable, the second sheath coupled to the fiber optic cable; and a demarcation element joining the first sheath and the second sheath, wherein the demarcation element comprises a substantially tubular element; wherein the pair of strength members are configured to engage the crimp body about the first sheath, the second sheath, and the demarcation element. The fiber optic cable comprises one or more optical fibers disposed partially within the fiber optic cable. The one or more optical fibers disposed partially within the fiber optic cable are optically coupled to the fiber optic connector through the first sheath, the second sheath, and the demarcation element. Optionally, the one or more optical fibers comprise a ribbon of optical fibers. Preferably, the first sheath is coupled to the crimp body via a lip structure manufactured into an end of the crimp body.

Preferably, the pair of strength members are configured to engage a pair of channels manufactured into sides of the crimp body. The pair of channels manufactured into the sides of the crimp body comprise a plurality of raised ridges configured to retain the pair of strength members.

In a still further aspect, a substantially flat fiber optic drop cable assembly comprises: a fiber optic connector comprising a fiber optic ferrule and a housing; a fiber optic cable comprising a pair of strength members disposed partially within the fiber optic cable; a first sheath disposed between the fiber optic connector and the fiber optic cable, the first sheath coupled to the fiber optic connector; a second sheath disposed between the fiber optic connector and the fiber optic cable, the second sheath coupled to the fiber optic cable; and a demarcation element joining the first sheath and the second sheath, wherein the demarcation element comprises a substantially tubular element. The fiber optic cable comprises one or more optical fibers disposed partially within the fiber optic cable. The one or more optical fibers disposed partially within the fiber optic cable are optically coupled to the fiber optic connector through the first sheath, the second sheath, and the demarcation element. Optionally, the one or more optical fibers comprise a ribbon of optical fibers. Preferably, the substantially flat fiber optic drop cable assembly also comprises a boot selectively disposed about the fiber optic connector.

Additional features and advantages of the present invention are set forth in the detailed description below. In view of this detailed description, other features and advantages will be readily apparent to those of ordinary skill in the art. It is to be understood that the general description above and the detailed description relate to exemplary embodiments of the present invention, and are intended to provide an overview and framework for understanding the nature and character of the present invention as it is claimed, explaining the principles of operation thereof.

BRIEF DESCRIPTION OF THE DRAWINGS

The present invention is illustrated and described herein with reference to the various drawings, in which like reference numbers are used to denote like system components/ methods steps, as appropriate, and in which.

DETAILED DESCRIPTION OF THE INVENTION

Reference will now be made to preferred embodiments of the present invention, examples of which are illustrated in the accompanying drawings. The present invention provides substantially flat drop cables with MT fiber optic connectors or plug assemblies that may quickly and easily be interconnected at a mid-span access location or at any other location in an optical network at which it is desired to use a drop cable. The present invention also provides substantially flat drop cables that have a stiffness that is low enough such that low-force polishing can be accomplished. The present invention further provides substantially flat drop cables that incorporate a minimum of relatively expensive strain relief material, while still limiting the amount of tension reaching a ferrule assembly when a cable is loaded.

Figure 1:
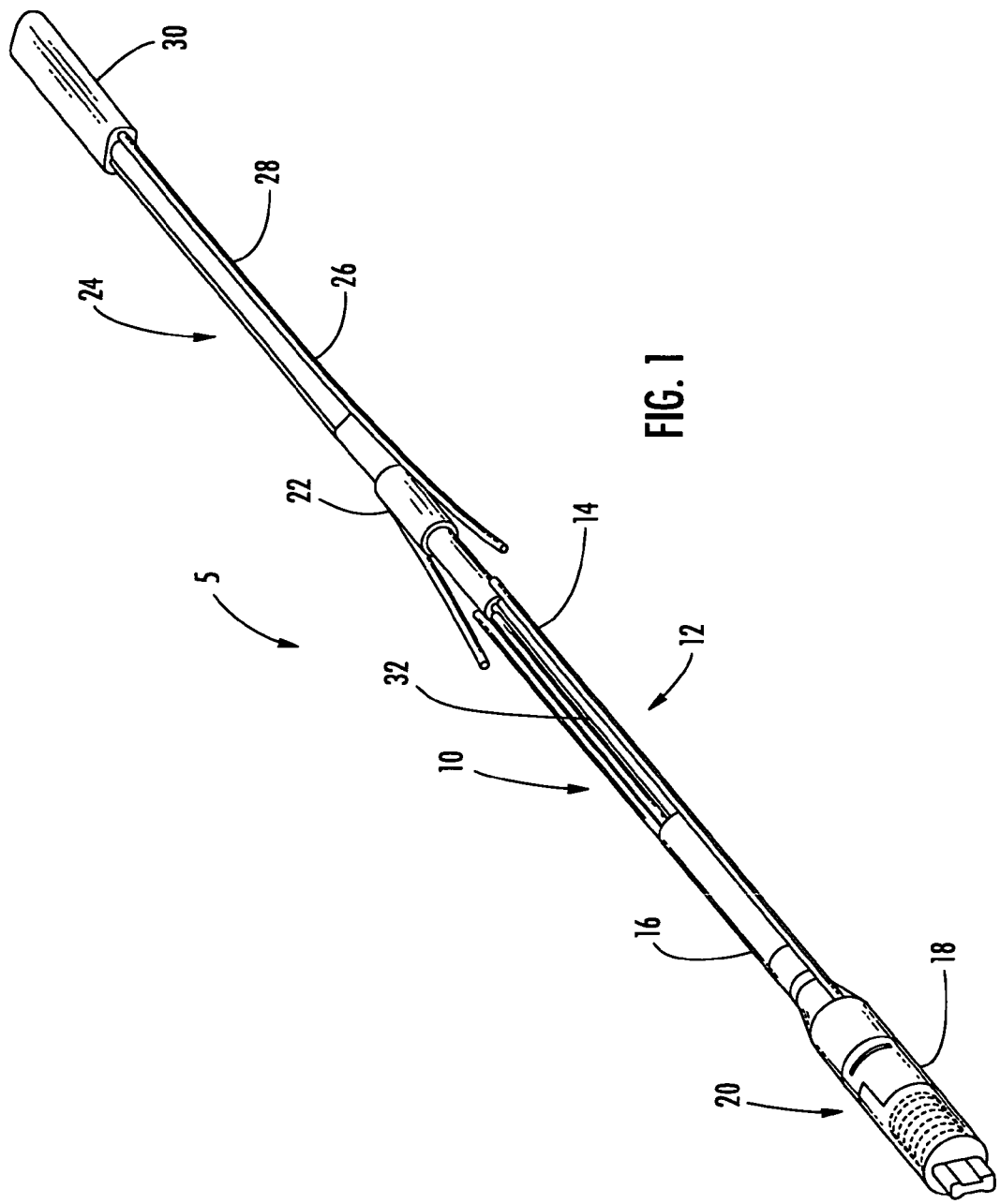
FIG. 1 is a perspective view illustrating one exemplary embodiment of a substantially flat drop cable assembly, the substantially flat drop cable assembly utilizing an overmolded furcation section incorporating telescoping tubing.

Referring to FIG. 1, in one exemplary embodiment, a substantially flat drop cable assembly 5 utilizes an overmolded furcation section 10 incorporating telescoping tubing 12 and a pair of glass reinforced plastic (GRP) strength members 14. This overmolded furcation section 10 effectively joins a strain relief member 16 that is joined to the inner plug housing 18 of an MT fiber optic connector 20 and a strain relief member 22 that is joined to a cable 24, incorporating a sheath 26, another pair of GRP strength members 28, an outer cover 30 (sheath), etc. One or more optical fibers 32, such as a ribbon of optical fibers or the like, run through the cable 24, the telescoping tubing 12 of the overmolded furcation section 10, and into the MT fiber optic connector 20. This configuration provides adequate free optical fiber length for low-force polishing and isolates the MT fiber optic connector 20 from forces generated in/experienced by the cable 24. In order to facilitate overmolding, the one or more optical fibers are preferably sealed from the overmold material. For low-pressure applications, this may be accomplished via the use of deformable rib features in elastomeric materials. For high-pressure applications, such as thermoplastic injection molding, other suitable approaches may be used. Preferably, the protection pieces are configured to telescope within each other. It should be noted that splitting the GRP strength members 14, 28 into two sections prevents forces from biasing the substantially flat drop cable assembly 5 in the overmold.

Figure 2:
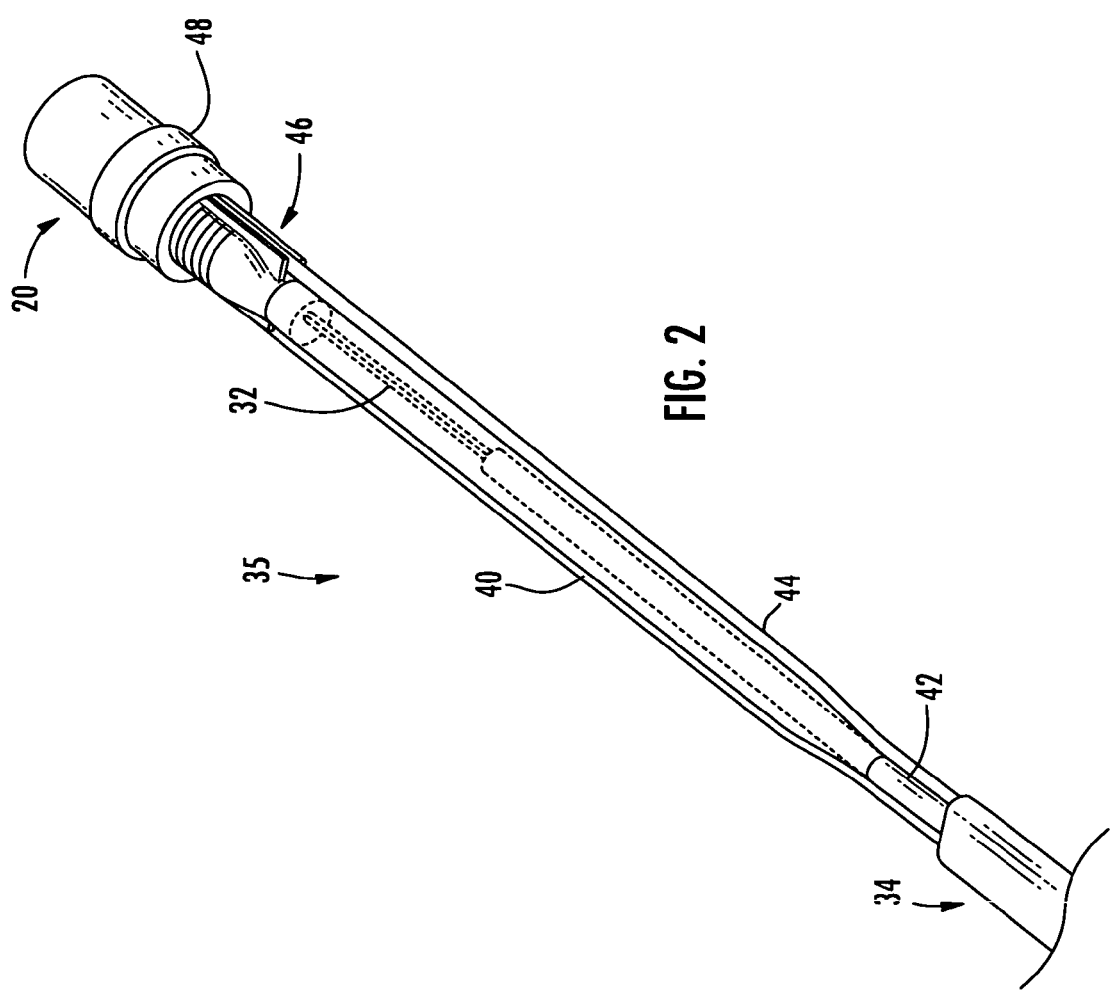
FIG. 2 is a perspective view illustrating another exemplary embodiment of a substantially flat drop cable assembly, the substantially flat drop cable assembly utilizing a flexible transition tube that telescopes over a buffer tube and a pair of glass-reinforced plastic (GRP) strength members that snap into a crimp body, the substantially flat drop cable assembly not performing a demarcation function.

Referring to FIG. 2, in another exemplary embodiment, a substantially flat drop cable assembly 35 utilizes a flexible transition tube 40 that telescopes over a buffer tube 42 and a pair of unbroken GRP strength members 44 that snap into a crimp body 46. The flexible transition tube 40 engages the crimp body 46, which engages the inner and/or outer plug housing(s) 48 associated with the MT fiber optic connector 20. The buffer tube 42, which isolates and protects the one or more optical fibers 32, engages the cable 34. As described below, the flexible transition tube 40 is preferably lipped where it engages the crimp body 46, thereby eliminating the need for a heat shrink or the like, and the pair of unbroken GRP strength members 44 preferably snap into the crimp body 46.

Advantageously, the fact that the flexible transition tube 40 telescopes over the buffer tube 42 provides the substantially flat drop cable assembly 35 with a stiffness that is low enough such that low-force polishing does not become problematic, while effectively isolating the MT fiber optic connector 20 from forces generated in/experienced by the cable 24. In this embodiment, the substantially flat drop cable assembly 35 does not perform a demarcation function. It should be noted that a splice-on variant of the substantially flat drop cable assembly 35 could be used, however, this would add a loss point and likely be more susceptible to damage during mechanical testing. A splint variant of the substantially flat drop cable assembly 35 could also be used. It should also be noted that it is not necessary that the pair of unbroken GRP strength members 44 snap into a crimp body 46 in order to provide adequate strength. Molded geometry could be added to the crimp body to serve as a GRP strength member "surrogate."

Figure 3:
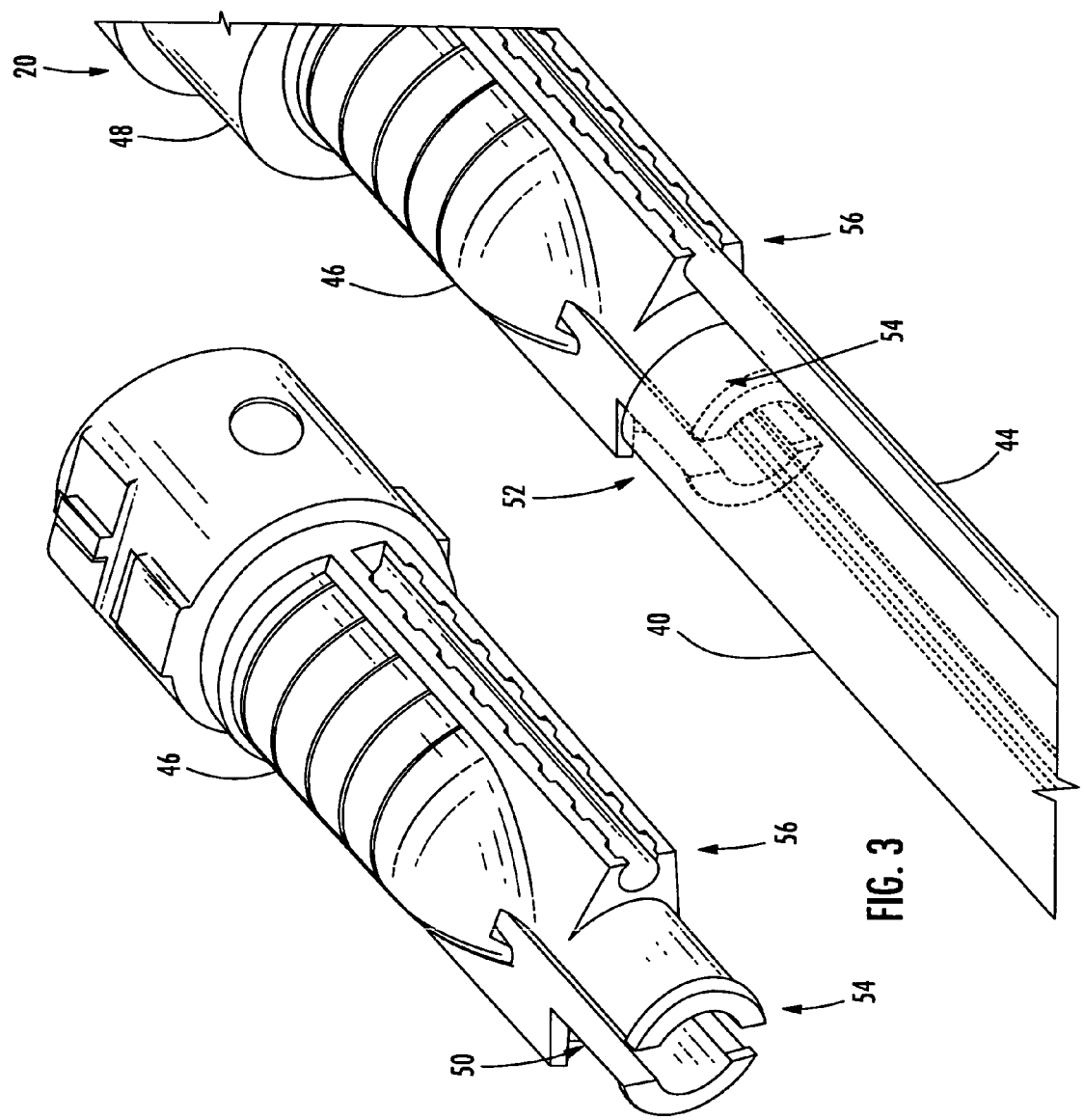
FIG. 3 is a perspective view illustrating two alternative embodiments of the crimp body of FIG. 2, one embodiment incorporating a slot at the end engaging the flexible transition tube and the other embodiment not incorporating a slot at the end engaging the flexible transition tube.
Figure 4:
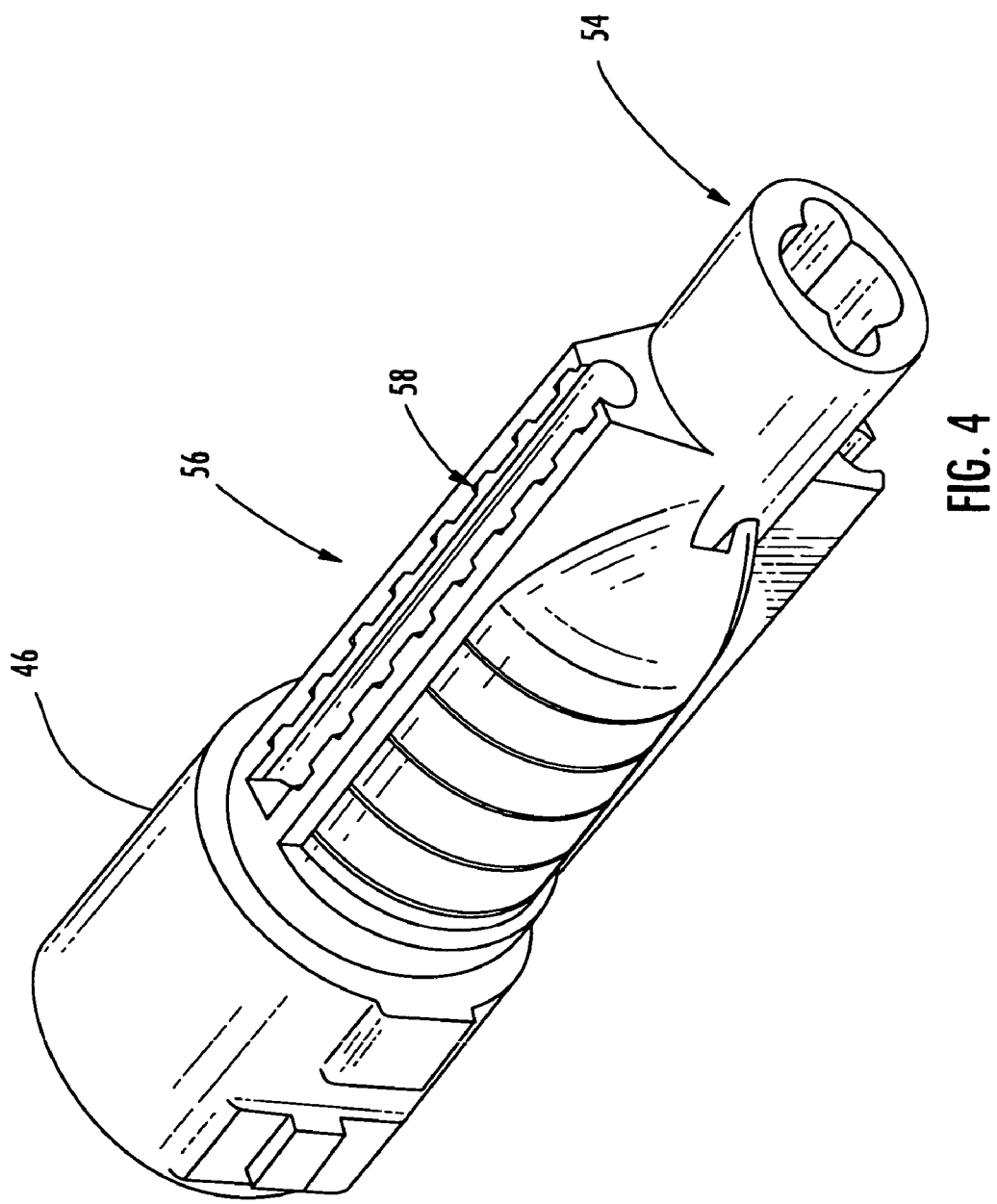
FIG. 4 is a perspective view illustrating another alternative embodiment of the crimp body of FIG. 2, the embodiment not incorporating a slot at the end engaging the flexible transition tube.
Figure 5:
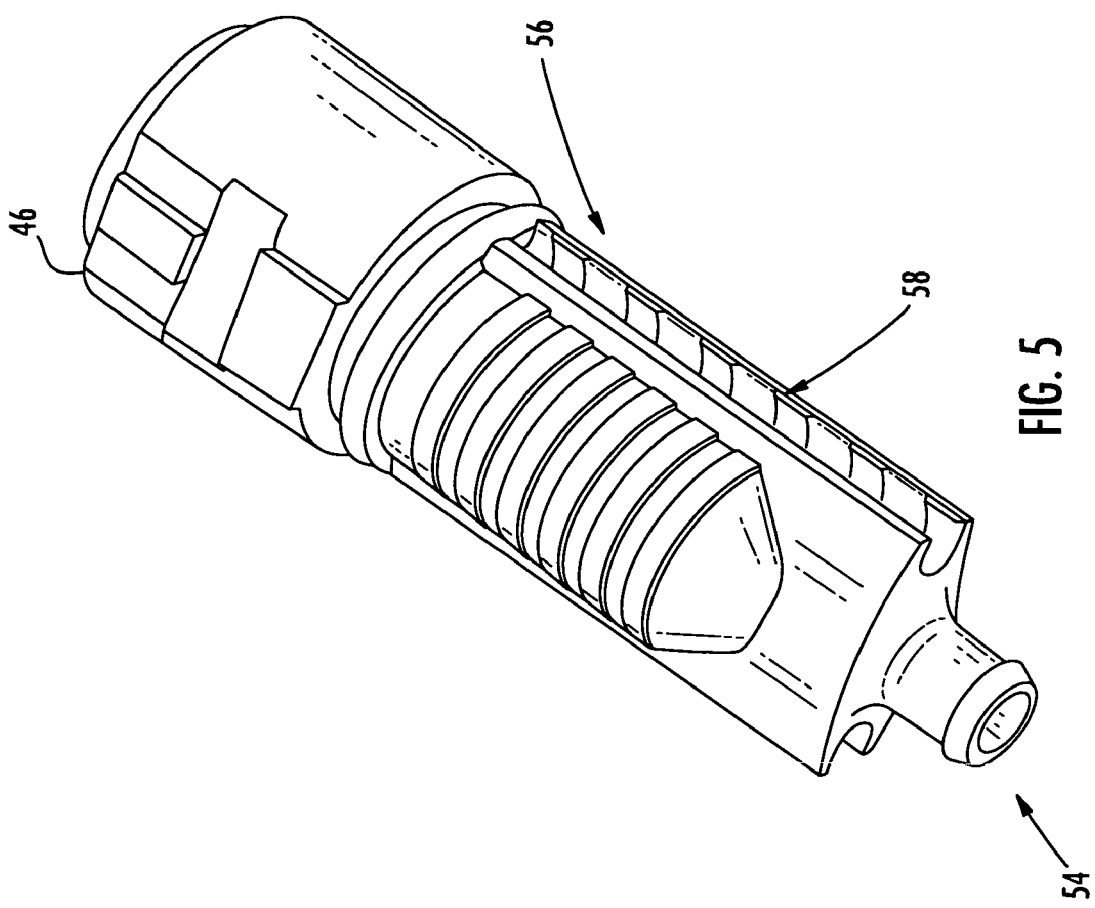
FIG. 5 is a perspective view illustrating a further alternative embodiment of the crimp body of FIG. 2, the embodiment not incorporating a slot at the end engaging the flexible transition tube.

Referring to FIG. 3, in one embodiment, the crimp body 46, which acts as a strain relief element while retaining the flexible transition tube 40 and joining it to the inner and/or outer plug housing(s) 48 associated with the MT fiber optic connector 20, incorporates a slot 50 at the end engaging the flexible transition tube 40. In another embodiment, the crimp body 46 does not incorporate a slot 50 at the end engaging the flexible transition tube 40. This slot 50 would help the lipped portion 52 of the flexible transition tube 40 mate with the lipped portion of the crimp body 46, making their snap-fit connection easier, but would also act as a point of potential failure. Again, no heat shrink or the like is required. As is illustrated, the pair of unbroken GRP strength members 44 snap into a pair of substantially C-shaped channels 56 manufactured into the exterior surface of the crimp body 46, thereby retaining them. FIGS. 4 and 5 illustrate other potential embodiments of the crimp body 46. It should be noted that, in all embodiments, the pair of substantially C-shaped channels 56 manufactured into the exterior surface of the crimp body 46 may include a plurality of raised ridges 58 that are configured to further retain the pair of unbroken GRP strength members 44 by providing frictional force.

Figure 6:
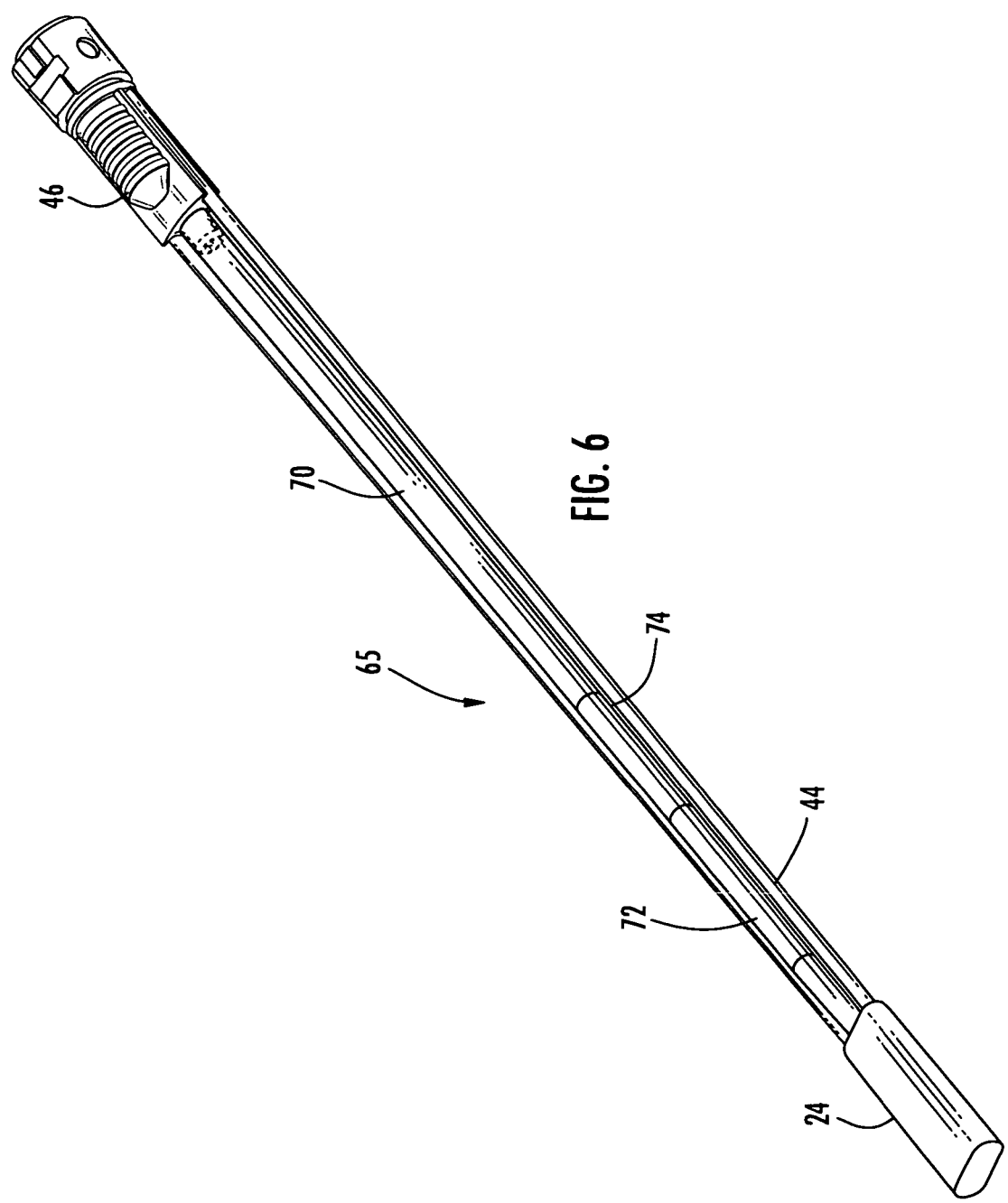
FIG. 6 is a perspective view illustrating a further exemplary embodiment of a substantially flat drop cable assembly, the substantially flat drop cable assembly utilizing a pair of GRP strength members that snap into a crimp body, the substantially flat drop cable assembly performing a demarcation function.

Referring to FIG. 6, in a further exemplary embodiment, a substantially flat drop cable assembly 65 utilizes a first sheath 70 that is joined with a second sheath 72 via a demarcation element 74 and a pair of unbroken GRP strength members 44 that snap into the crimp body 46. The demarcation element 74 may consist of a relatively simple tubular element, for example, as described below, and is preferably positioned within about 6 inches of the end of the substantially flat drop cable assembly 65. The demarcation element 74 isolates the MT fiber optic connector (not illustrated) from forces generated in/experienced by the cable 24. Preferably, the demarcation element 74 is capable of holding the one or more optical fibers (not illustrated) fixed against loads approaching about 250 gm/optical fiber and preventing any off-axis bending from taking place. Accordingly, the demarcation element 74 may be a relatively short element in which all of the one or more optical fibers are forced to be straight, thus solving the off-axis bending problem. The length of the bonded section resists the forces generated by optical fiber strain. Preferably, the one or more optical fibers are coated, virgin optical fibers or bare glass at the demarcation element 74. The first sheath 70 is preferably lipped where it engages the crimp body 46, thereby eliminating the need for a heat shrink or the like, and the pair of unbroken GRP strength members 44 preferably snap into the crimp body 46. This free-floating configuration prevents misalignment during the molding process. Again, the substantially flat drop cable assembly 65 has a stiffness that is low enough such that low-force polishing does not become problematic, while effectively isolating the MT fiber optic connector from forces generated in/experienced by the cable 24. In this embodiment, the substantially flat drop cable assembly 65 does perform a demarcation function.

Figure 7:
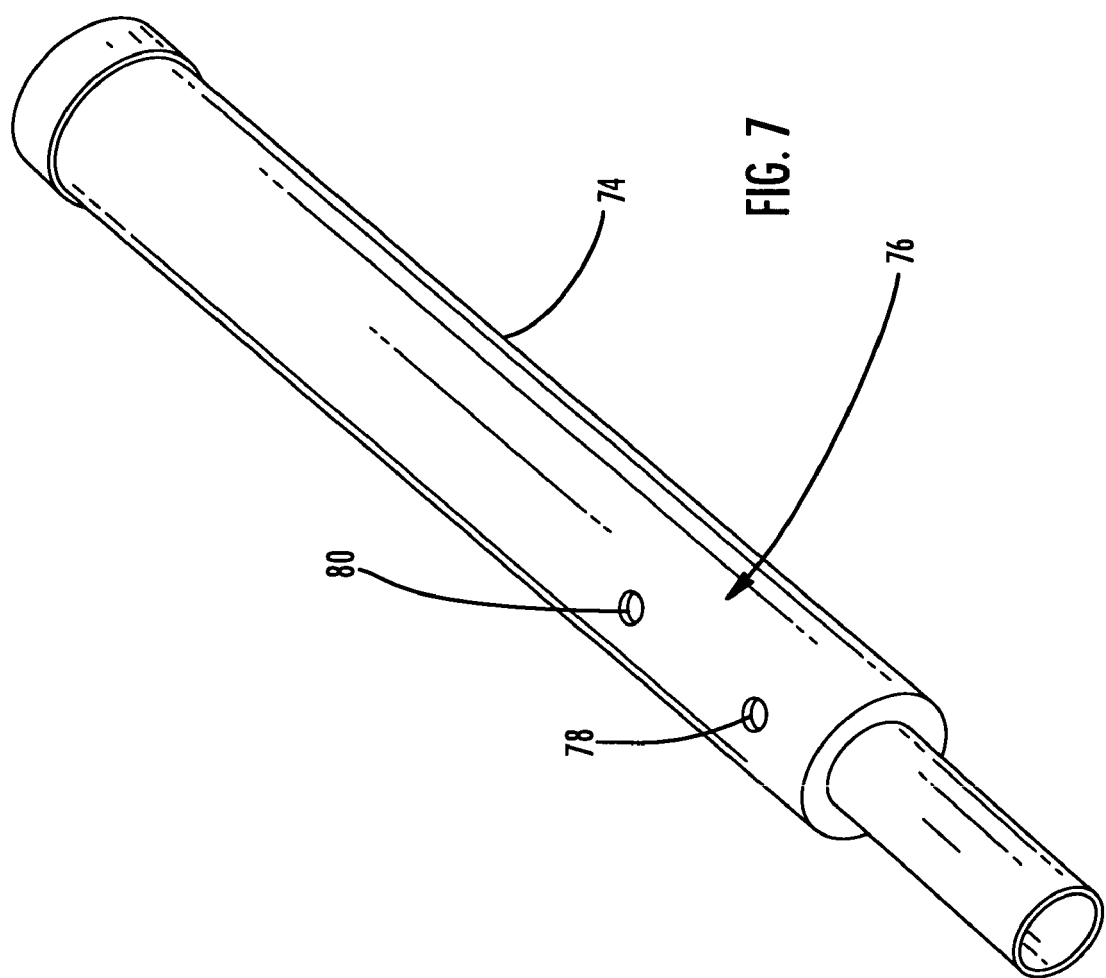
FIG. 7 is a perspective view illustrating one alternative embodiment of a demarcation element of FIG. 6.

Referring to FIG. 7, in one alternative embodiment, the demarcation element 74 includes a pair of fill holes 76. An ultraviolet (UV)-curable material or the like is deposited through the lower fill hole 78 in order to plug the lower portion of the enclosure. Subsequently, a UV-curable material or the like is deposited through the upper fill hole 80 in order to fill the upper portion of the enclosure. This promotes the straightness of the one or more optical fibers (not illustrated) in the lead section.

Figure 8:
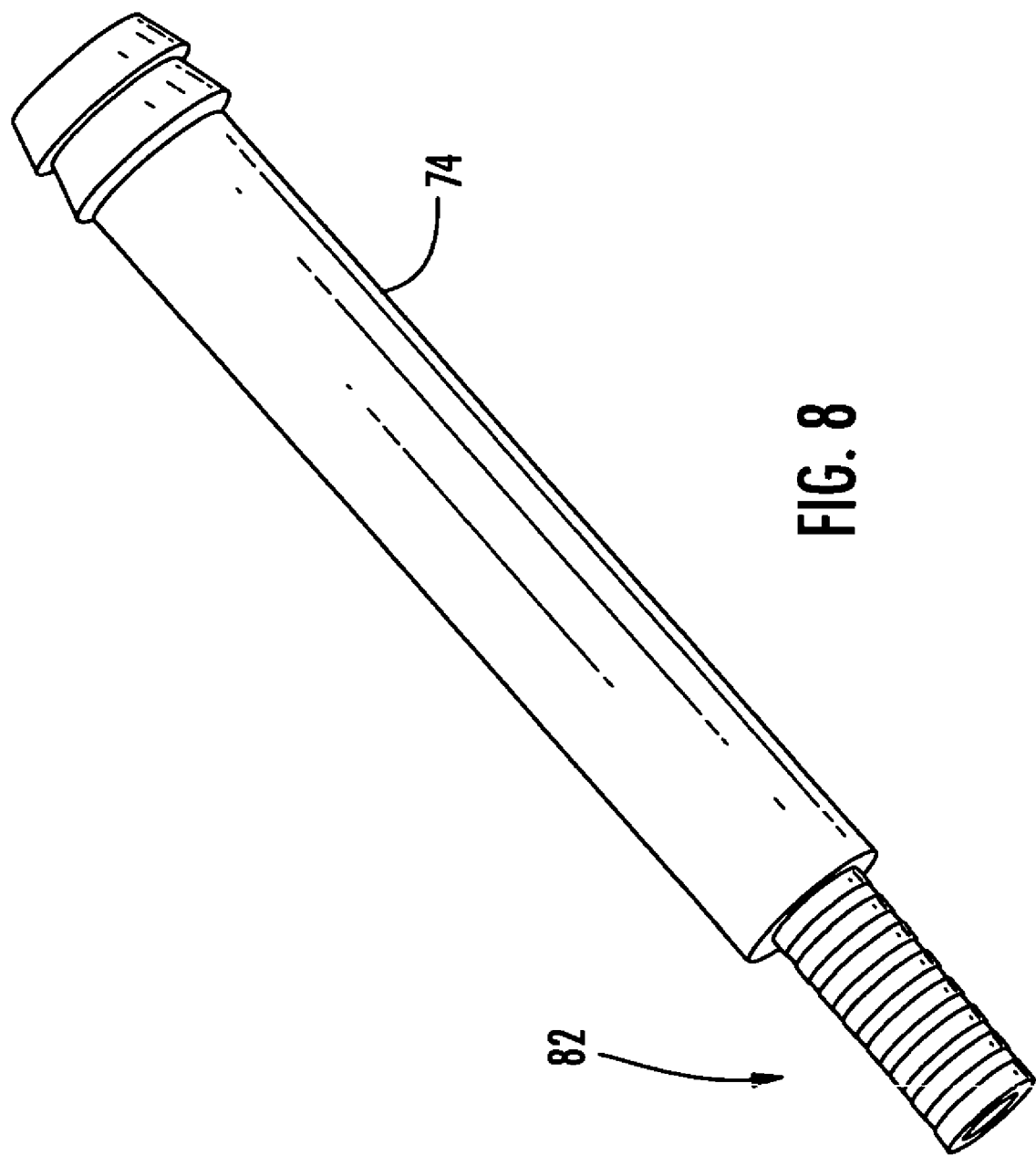
FIG. 8 is a perspective view illustrating another alternative embodiment of a demarcation element of FIG. 6.

Referring to FIG. 8, in another alternative embodiment, the demarcation element 74 includes a barbed lower portion 82 that is configured to securely engage and retain the second sheath (not illustrated). In either alternative embodiment, the demarcation element 74 has an upper portion outside diameter of about 3 mm and a lower portion outside diameter of about 2 mm, although other suitable dimensions may be used.

Figure 9:
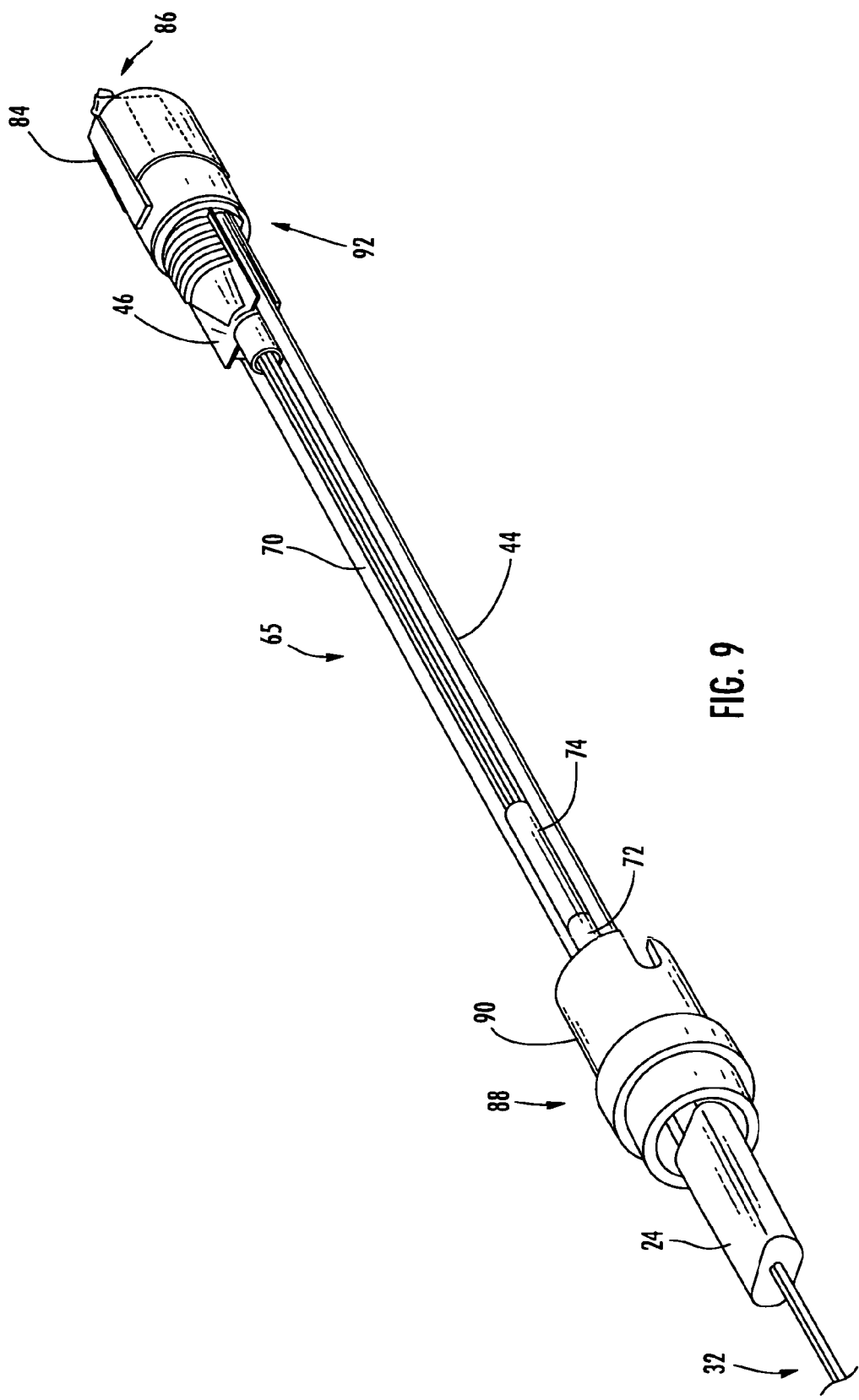
FIG. 9 is another perspective view illustrating the substantially flat drop cable assembly of FIG. 6, the substantially flat drop cable assembly utilizing a plug inner housing assembly incorporating an MT ferrule and a plug outer housing assembly.

Referring to FIG. 9, the crimp body 46 is coupled to a plug inner housing assembly 84 that incorporates an MT ferrule 86. A plug outer housing assembly 88 incorporating a shroud 90 is disposed about the substantially flat drop cable assembly 65 and selectively engages the plug inner housing assembly 84. The one or more optical fibers 32 run through the cable 24, the second sheath 72, the demarcation element 74, and the first sheath 70, engaging the MT ferrule 86, thereby optically coupling the cable 24 and the MT ferrule 86. An O-ring 92 disposed between the plug inner housing assembly 84 and the plug outer housing assembly 88 sealingly joins the two components.

Figure 10:
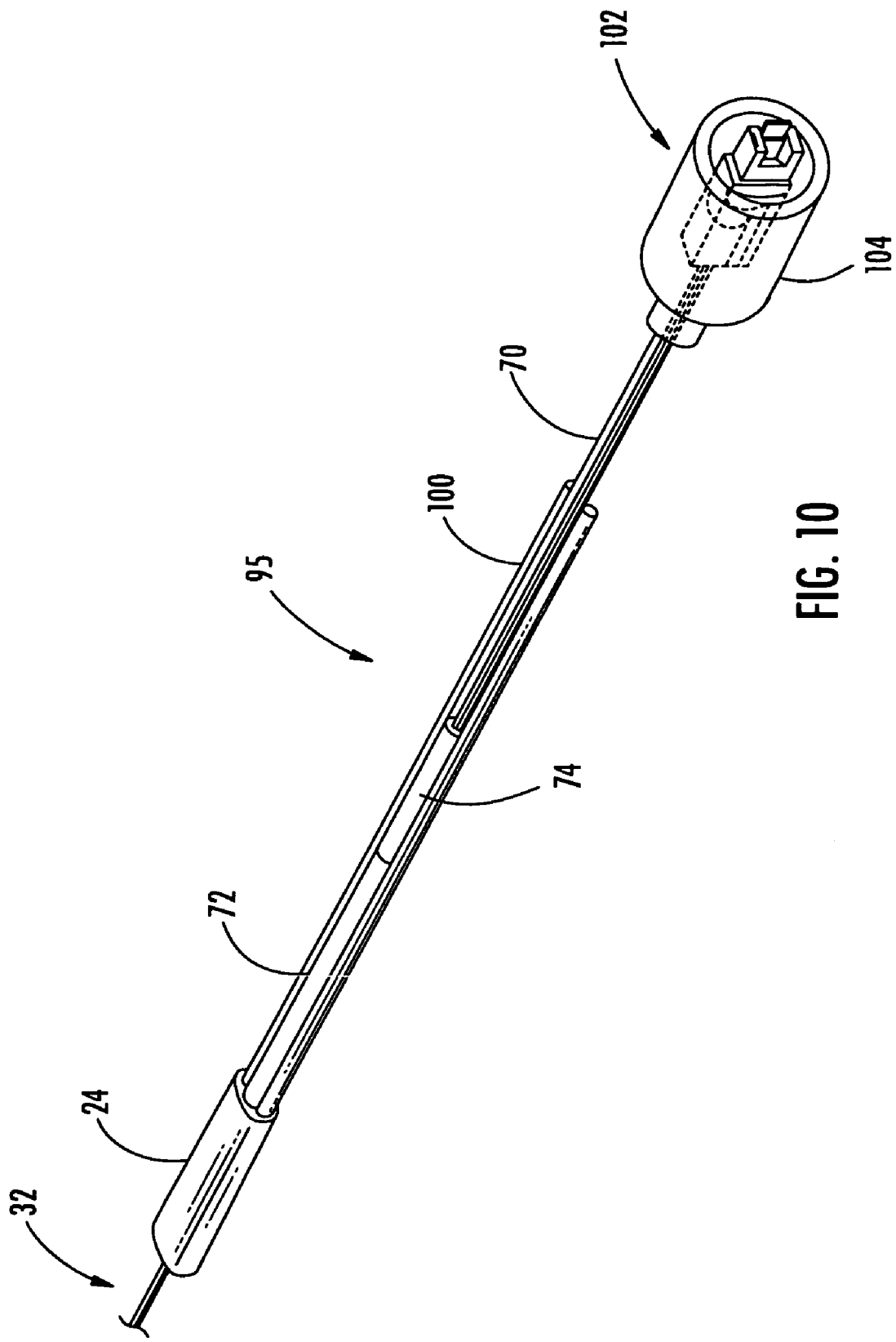
FIG. 10 is a perspective view illustrating a still further exemplary embodiment of a substantially flat drop cable assembly, the substantially flat drop cable assembly utilizing a pair of GRP strength members, the substantially flat drop cable assembly performing a demarcation function.

Referring to FIG. 10, in a still further exemplary embodiment, a substantially flat drop cable assembly 95 utilizes a first sheath 70 that is joined with a second sheath 72 via a demarcation element 74 and a pair of arbitrary-lengthed GRP strength members 100. Again, the demarcation element 74 may consist of a relatively simple tubular element, for example, as described above, and is preferably positioned within about 6 inches of the end of the substantially flat drop cable assembly 95. The demarcation element 74 isolates the MT fiber optic connector 102 from forces generated in/experienced by the cable 24. Preferably, the demarcation element 74 is capable of holding the one or more optical fibers 32 fixed against loads approaching about 250 gm/optical fiber and preventing any off-axis bending from taking place. Accordingly, the demarcation element 74 may be a relatively short element in which all of the one or more optical fibers 32 are forced to be straight, thus solving the off-axis bending problem. The length of the bonded section resists the forces generated by optical fiber strain. Preferably, the one or more optical fibers are coated, virgin optical fibers or bare glass at the demarcation element 74. The first sheath 70 is preferably lipped where it engages a boot 104, thereby eliminating the need for a heat shrink or the like. Again, the substantially flat drop cable assembly 65 has a stiffness that is low enough such that low-force polishing does not become problematic, while effectively isolating the MT fiber optic connector 102 from forces generated in/experienced by the cable 24. In this embodiment, the substantially flat drop cable assembly 95 does perform a demarcation function.

Figure 11:
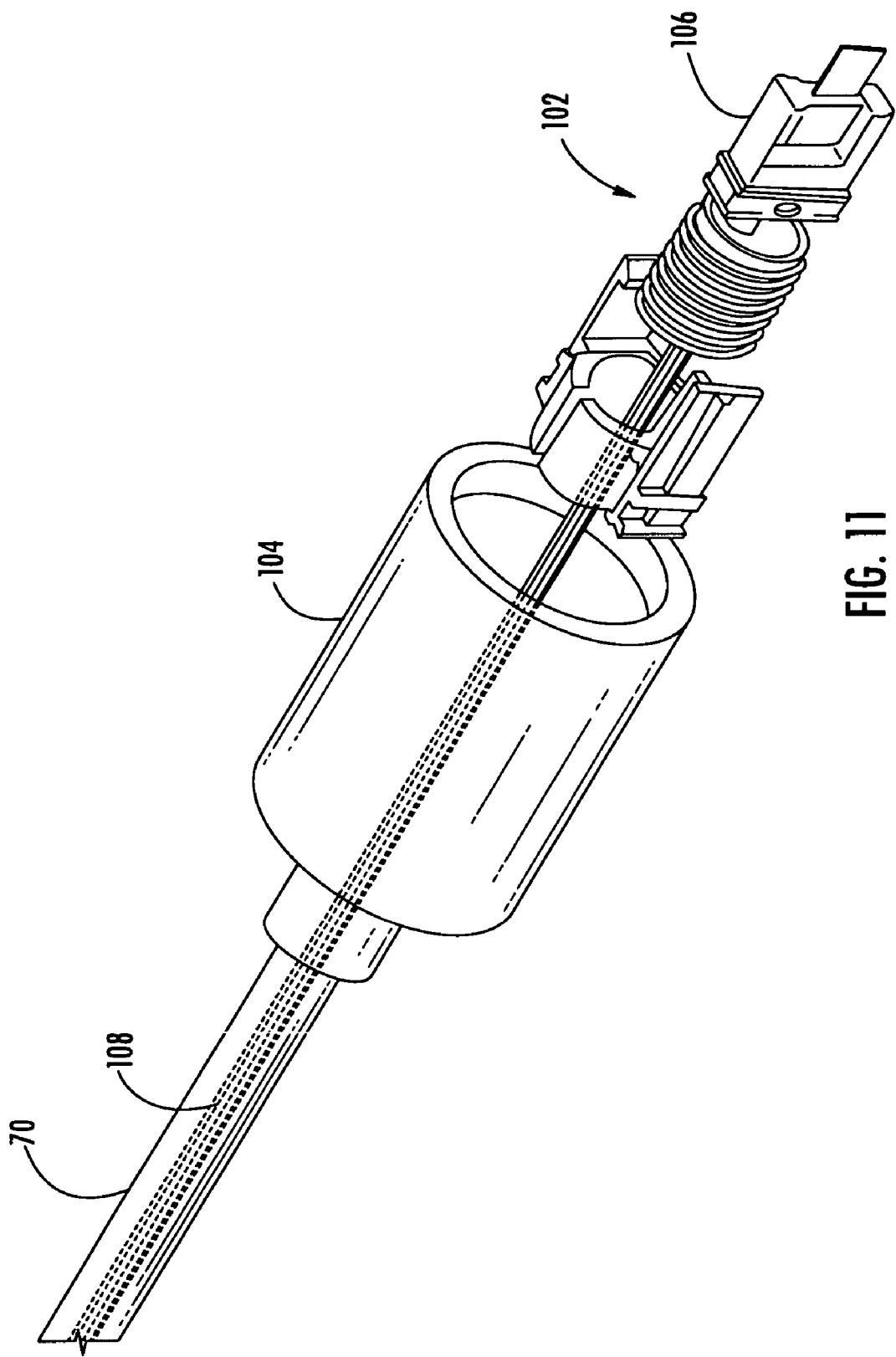
FIG. 11 is a perspective view of a portion of the substantially flat drop cable assembly of FIG. 10, highlighting the configuration of the MT fiber optic connector and boot.

FIG. 11 highlights the configuration of the MT fiber optic connector 102 and the boot 104. Preferably, the MT fiber optic connector 102 incorporates an MT ferrule 106 or the like that is optically coupled to ribbonized optical fiber 108 or the like.

Figure 12:
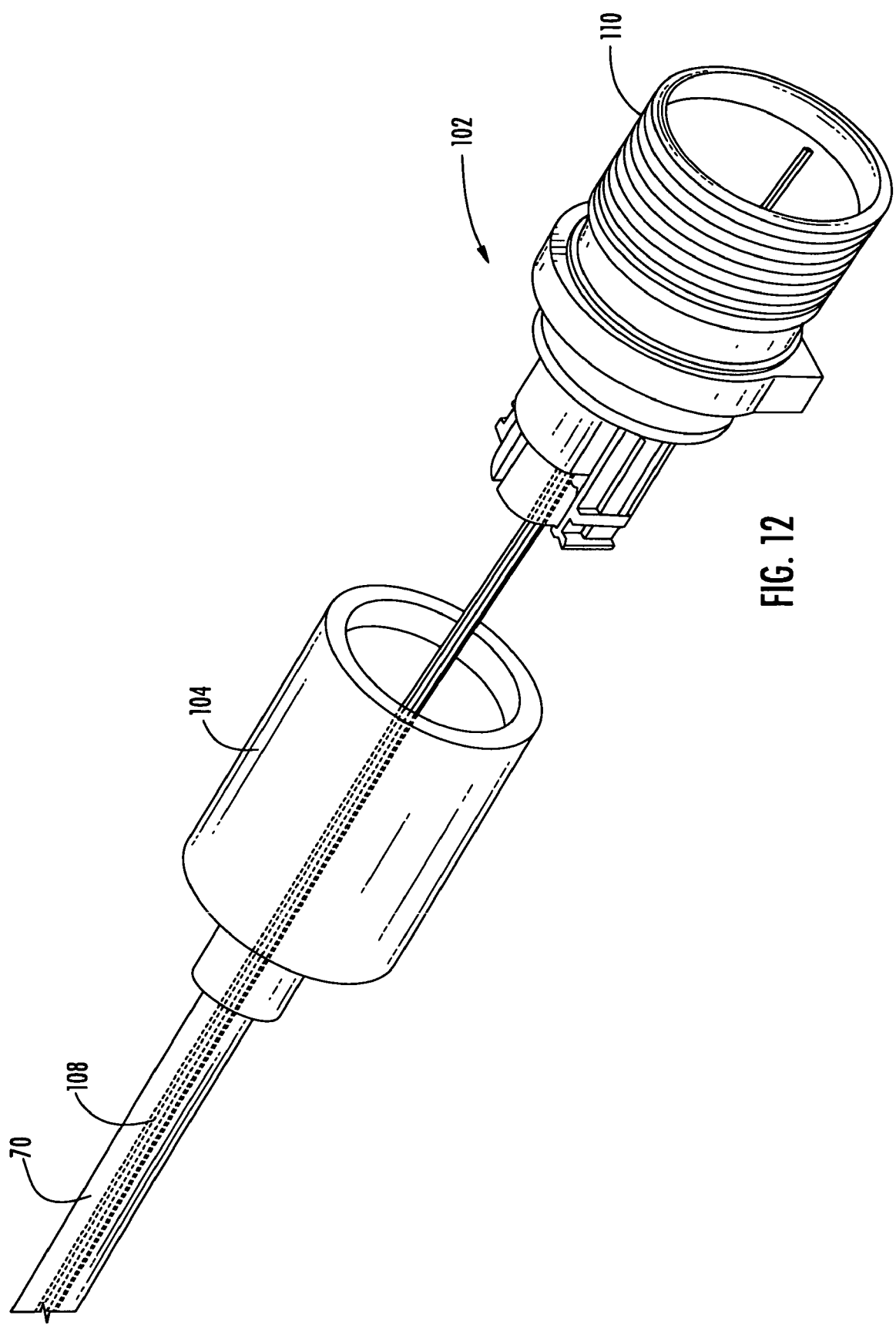
FIG. 12 is another perspective view of a portion of the substantially flat drop cable assembly of FIG. 10, the substantially flat drop cable assembly having a receptacle housing installed.
Figure 13:
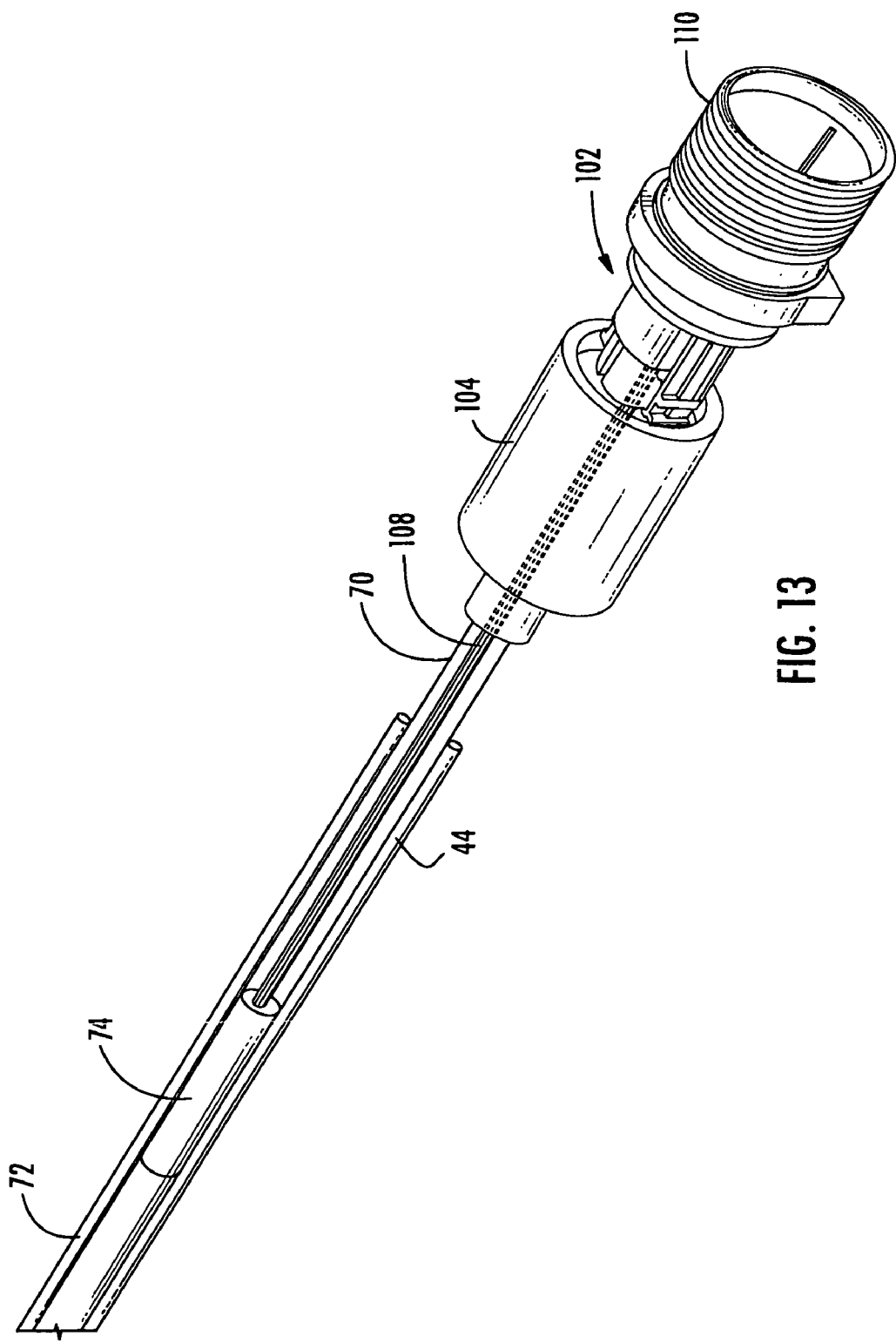
FIG. 13 is a further perspective view of a portion of the substantially flat drop cable assembly of FIG. 10, the substantially flat drop cable assembly having the receptacle housing installed.
Figure 14:
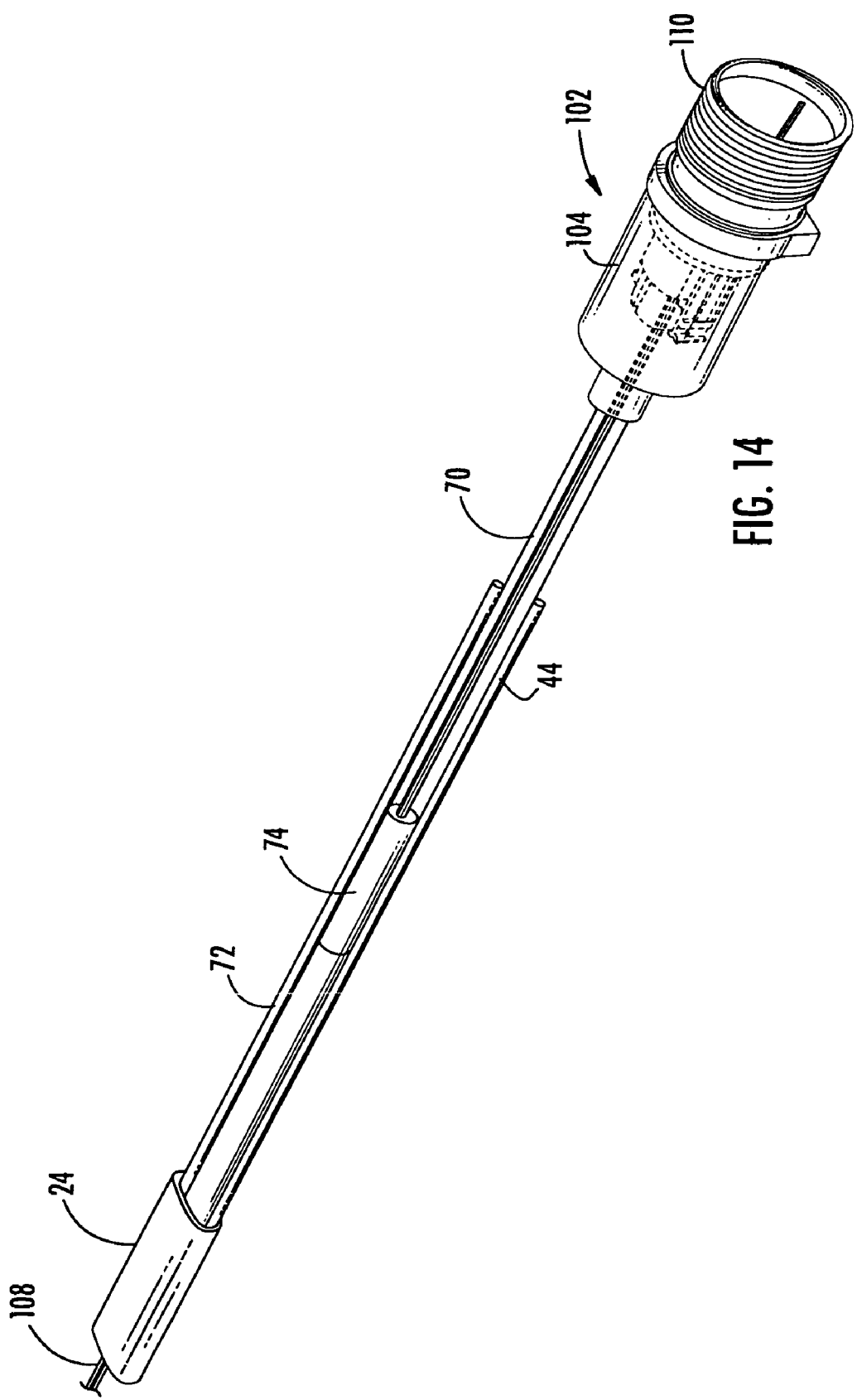
FIG. 14 is a still further perspective view of a portion of the substantially flat drop cable assembly of FIG. 10, the substantially flat drop cable assembly having the receptacle housing installed.

FIGS. 12-14 also highlight the configuration of the MT fiber optic connector 102. The MT fiber optic connector 102 incorporates a receptacle housing 110.

Although the present invention has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A fiber optic drop cable assembly, comprising:
   a fiber optic cable comprising at least one strength member;
   a fiber optic connector mounted upon an end of the fiber optic cable; and
   a demarcation element positioned behind the fiber optic connector operable to separate the fiber optic connector from strength member forces from the at least one strength member of the fiber optic cable.

2. The fiber optic drop cable assembly of claim 1, further comprising:
   a first strain relief member coupled to the fiber optic connector;
   a second strain relief member coupled to the fiber optic cable;
   a first pair of strength members associated with the demarcation element; and
   a second pair of strength members associated with the fiber optic cable.

3. The fiber optic drop cable assembly of claim 1, wherein the demarcation element is a furcation section comprising telescoping tubing.

4. A fiber optic drop cable assembly, comprising:
   a fiber optic connector comprising a fiber optic ferrule and a housing;
   a first strain relief member coupled to the housing of the fiber optic connector;
   a fiber optic cable;
   a second strain relief member coupled to the fiber optic cable;
   an overmolded furcation section comprising telescoping tubing joining the first strain relief member coupled to the housing of the fiber optic connector and the second strain relief member coupled to the fiber optic cable, wherein the fiber optic connector is isolated from forces from the fiber optic cable;
   a first pair of strength members associated with the furcation section; and
   a second pair of strength members associated with the fiber optic cable.

5. The fiber optic drop cable assembly of claim 4, wherein at least one optical fiber disposed partially within the fiber optic cable is optically coupled to the fiber optic connector through the furcation section.

6. A fiber optic drop cable assembly, comprising:
   a fiber optic connector comprising a fiber optic ferrule and a housing;
   a crimp body coupled to the housing of the fiber optic connector;
   a fiber optic cable comprising a pair of strength members disposed partially within the fiber optic cable;
   a buffer tube disposed partially within the fiber optic cable; and
   a flexible transition tube coupled to the crimp body and configured to telescope over the buffer tube;
   wherein the pair of strength members are configured to engage the crimp body about the buffer tube and flexible transition tube.

7. The fiber optic drop cable assembly of claim 6, wherein one or more optical fibers disposed partially within the fiber optic cable are optically coupled to the fiber optic connector through the buffer tube and flexible transition tube.

8. The fiber optic drop cable assembly of claim 6, wherein the flexible transition tube is coupled to the crimp body via a lip structure manufactured into an end of the crimp body.

9. The fiber optic drop cable assembly of claim 6, wherein the pair of strength members are each configured to engage a corresponding one of a pair of channels manufactured into sides of the crimp body.

10. The drop cable assembly of claim 9, wherein the pair of channels manufactured into the sides of the crimp body comprise a plurality of raised ridges configured to retain the pair of strength members.

11. A fiber optic drop cable assembly, comprising:
    a fiber optic connector comprising a fiber optic ferrule and a housing;
    a crimp body coupled to the housing of the fiber optic connector;
    a fiber optic cable comprising a pair of strength members disposed par-daily within the fiber optic cable;
    a first sheath disposed between the fiber optic connector and the fiber optic cable, the first sheath coupled to the crimp body;
    a second sheath disposed between the fiber optic connector and the fiber optic cable, the second sheath coupled to the fiber optic cable; and
    a demarcation element joining the first sheath and the second sheath, wherein the demarcation element comprises a substantially tubular element;
    wherein the pair of strength members are configured to engage the crimp body about the first sheath, the second sheath, and the demarcation element.

12. The fiber optic drop cable assembly of claim 11, wherein the fiber optic cable comprises one or more optical fibers disposed partially within the fiber optic cable.

13. The fiber optic drop cable assembly of claim 12, wherein the one or more optical fibers disposed partially within the fiber optic cable are optically coupled to the fiber optic connector through the first sheath, the second sheath, and the demarcation element.

14. The fiber optic drop cable assembly of claim 11, wherein the first sheath is coupled to the crimp body via a lip structure manufactured into an end of the crimp body.

15. The fiber optic drop cable assembly of claim 11, wherein the pair of strength members are each configured to engage a corresponding one of a pair of channels manufactured into sides of the crimp body.

16. The drop cable assembly of claim 15, wherein the pair of channels manufactured into the sides of the crimp body comprise a plurality of raised ridges configured to retain the pair of strength members.

17. A fiber optic drop cable assembly, comprising:
 a fiber optic connector comprising a fiber optic ferrule and a housing;
 a fiber optic cable comprising a pair of strength members disposed partially within the fiber optic cable;
 a first sheath disposed between the fiber optic connector and the fiber optic cable, the first sheath coupled to the fiber optic connector;
 a second sheath disposed between the fiber optic connector and the fiber optic cable, the second sheath coupled to the fiber optic cable; and
 a demarcation element joining the first sheath and the second sheath, wherein the demarcation element comprises a substantially tubular element and is configured to isolate the fiber optic connector from forces from the fiber optic cable.

18. The fiber optic drop cable assembly of claim 17, wherein one or more optical fibers disposed partially within the fiber optic cable are optically coupled to the fiber optic connector through the first sheath, the second sheath, and the demarcation element.

19. The fiber optic drop cable assembly of claim 17, further comprising a boot selectively disposed about the fiber optic connector.

20. The fiber optic drop cable assembly of claim 6, wherein the buffer tube includes an end disposed outside of the crimp body and the flexible transition tube telescopes over the end of the buffer tube.

* * * * *